United States Patent
Romans

[11] Patent Number: 5,992,338
[45] Date of Patent: Nov. 30, 1999

[54] BELTED SEED METERING DEVICE

[76] Inventor: William W. Romans, 1121 NW. Parkridge Dr., Ankeny, Iowa 50021

[21] Appl. No.: 08/951,113

[22] Filed: Oct. 15, 1997

[51] Int. Cl.$^6$ ..................................................... A01C 7/18
[52] U.S. Cl. ............................................................. 111/171
[58] Field of Search .................................... 111/171, 172

[56] References Cited

U.S. PATENT DOCUMENTS

| | | | |
|---|---|---|---|
| 12,152 | 1/1855 | Anderson. | |
| 262,439 | 8/1882 | Lindsay et al. | 111/172 X |
| 467,683 | 1/1892 | Essex | 111/171 |
| 1,264,454 | 4/1918 | Terrell et al. | 111/172 X |
| 1,865,376 | 6/1932 | Kohler | 111/172 |
| 2,302,499 | 11/1942 | Lacson | 111/52 |
| 2,619,261 | 11/1952 | Pick et al. | 222/371 |
| 2,758,756 | 8/1956 | Tea, Jr. | 111/171 X |
| 2,760,684 | 8/1956 | Reilly | 111/171 X |
| 3,077,290 | 2/1963 | Rehder | 222/56 |
| 3,122,283 | 2/1964 | Walters | 222/371 |
| 3,325,060 | 6/1967 | Rehder | 222/371 |
| 3,631,825 | 1/1972 | Weiste | 111/11 |
| 3,971,446 | 7/1976 | Nienberg | 172/311 |
| 5,392,707 | 2/1995 | Romans | 111/185 |
| 5,542,364 | 8/1996 | Romans | 111/185 |

*Primary Examiner*—Christopher J. Novosad
*Attorney, Agent, or Firm*—Zarley, McKee, Thomte, Voorhees & Sease

[57] ABSTRACT

An seed metering device and method for disbursing agricultural seed and the like singularly and accurately comprising sprocket wheels, a seed conveyor device, a housing. A seed conveyor device interlocks with and surrounds sprocket wheels and rotates similarly to the sprocket wheels when rotated by a power source. Seeds are singulated and carried through a closed area formed by the walls of the housing by the seed conveyor device from a seed containment area to a seed release area. The metering device can accommodate a variety of seed types, sizes, and shapes, and will operate at a variety of speeds for different speed disbursement rates.

9 Claims, 3 Drawing Sheets

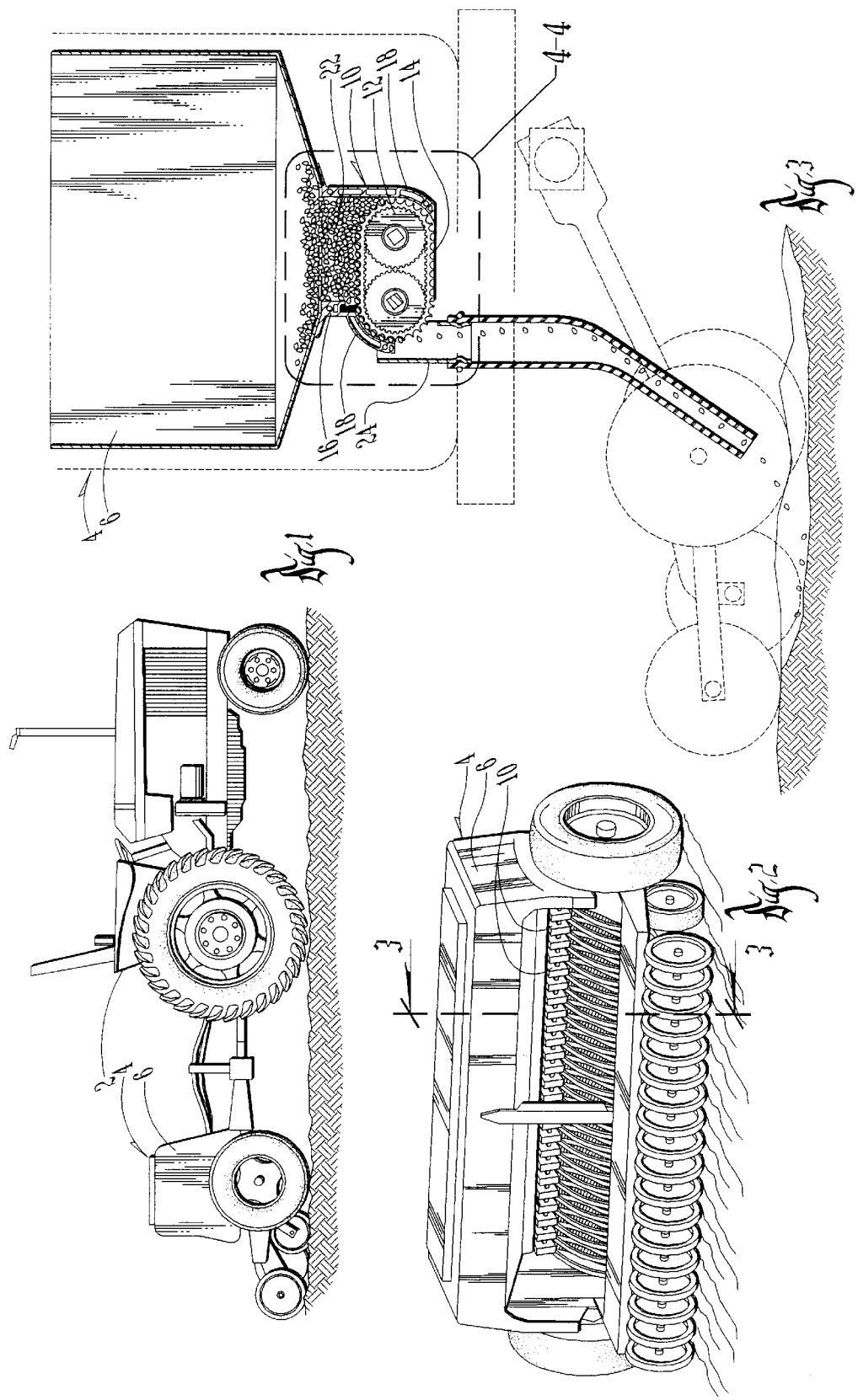

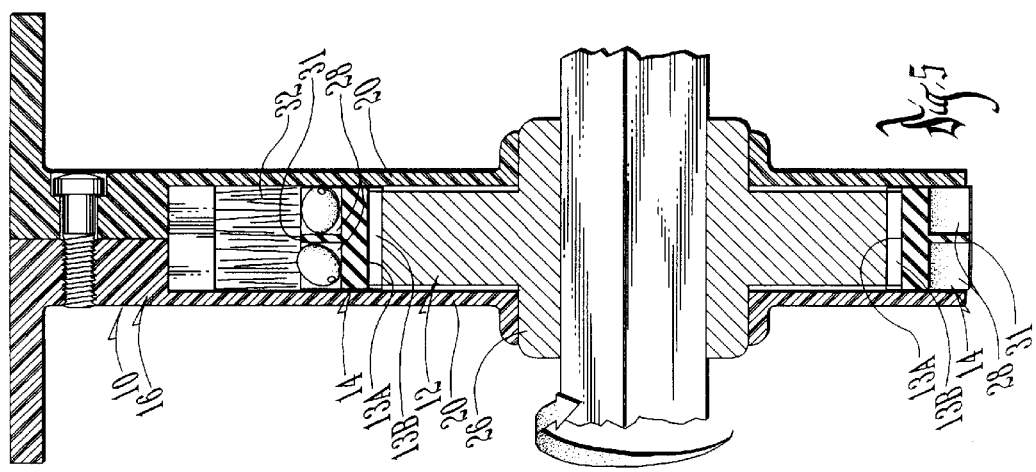
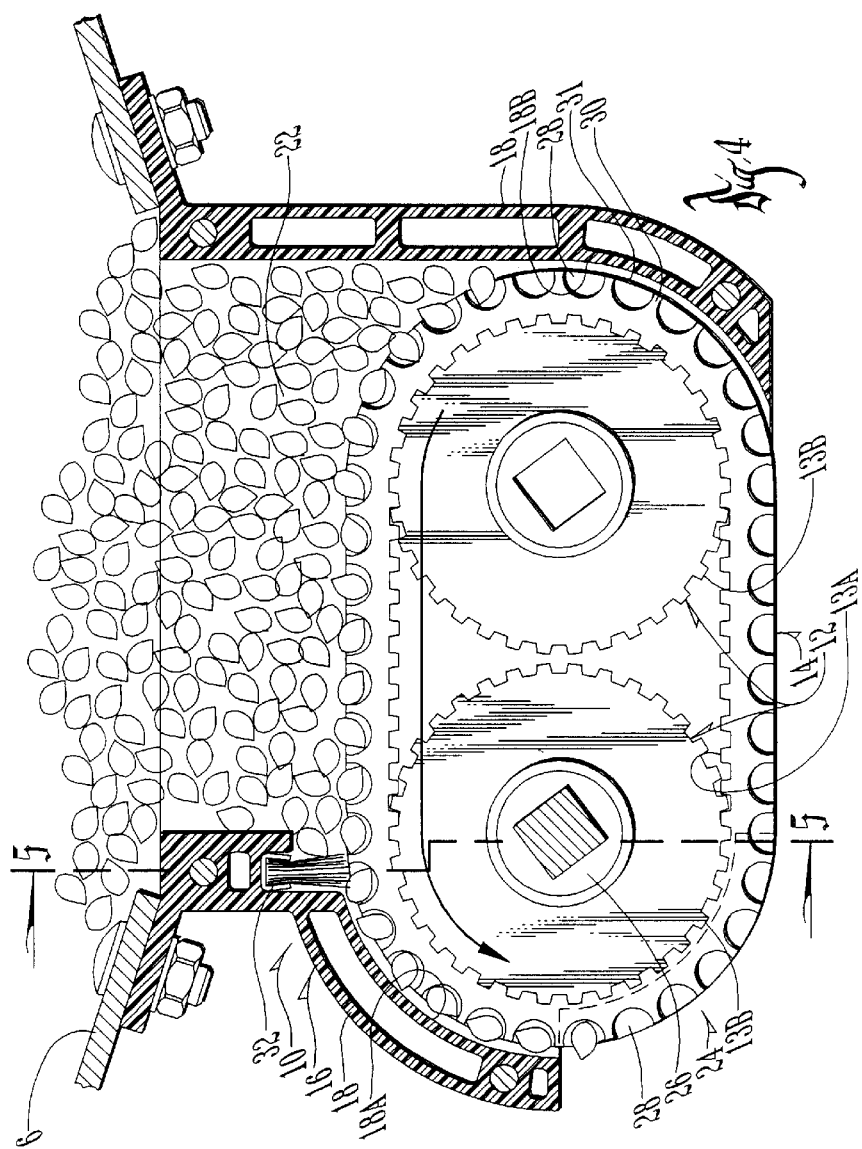

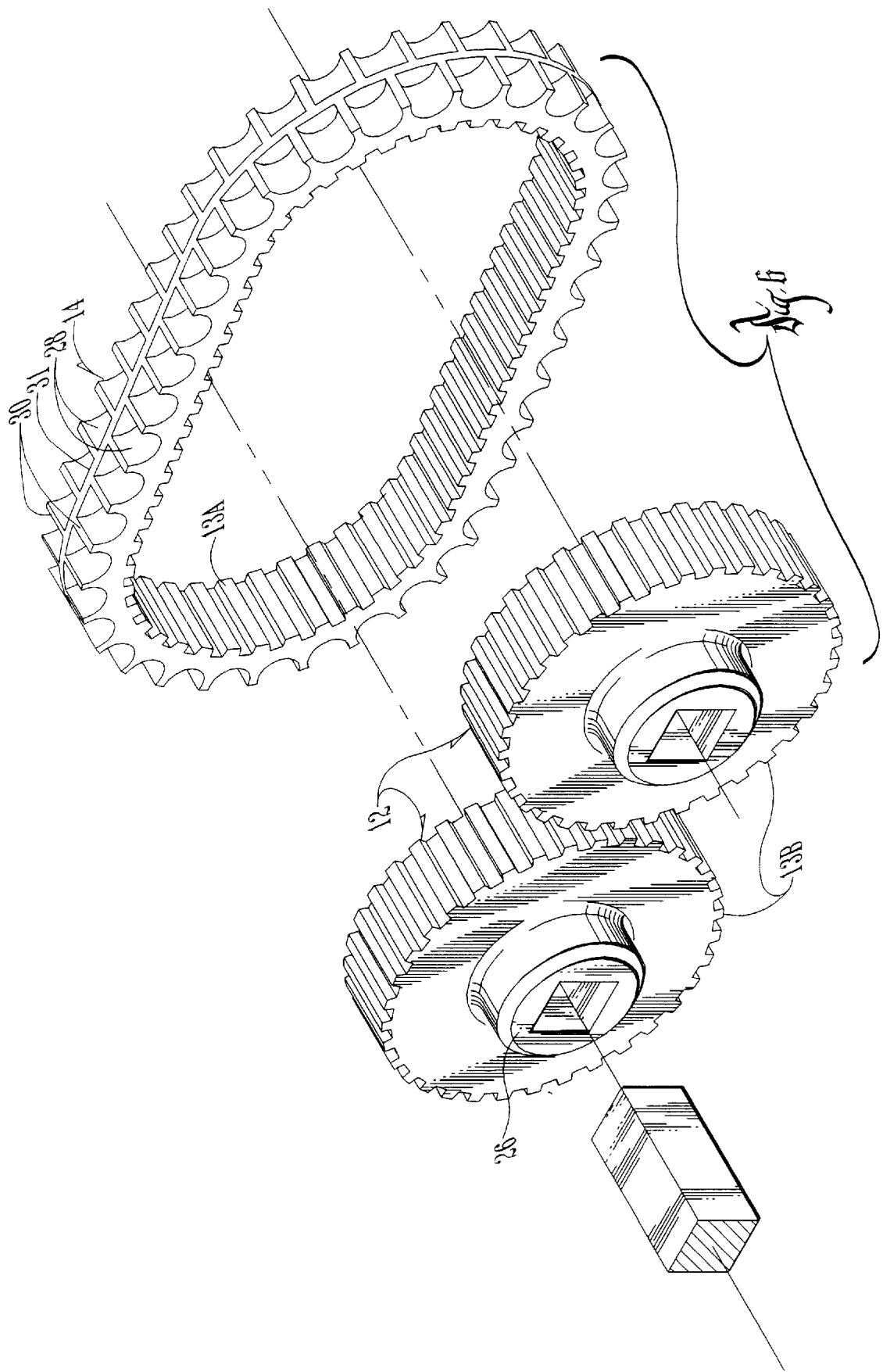

BELTED SEED METERING DEVICE

BACKGROUND OF THE INVENTION

A. Field of the Invention

The present invention relates to seed planting and, in particular, to seed metering for agricultural planting for a variety of different types of seeds and conditions.

This invention allows a user to dispense agricultural seed and the like uniformly and singularly, with greater accuracy, at a reduced cost, with less maintenance, and less damage to the seed.

B. Problems in the Art

Devices and methods for planting seeds are well known. Conventional inventions provide a variety of approaches for planting that depend upon, but are not limited to, the type, size, and shape of seeds, ground characteristics, row width, and plant spacing.

Dispensing seed accurately in a uniform singular nondestructive manner is one beneficial effect provided by planting devices. To achieve this benefit, many conventional planters include metering devices which are also well known. Some planters, because of the sheer size of their metering device are inflexible and cumbersome to use. Other metering devices relying on compressed air sources and vacuums are complex and require substantial maintenance, plus are expensive to produce. Still other metering devices, some relying on a belt conveyor means which either jams or fails to protect seeds, do not sufficiently dispense seeds uniformly at an acceptable level of nondestructability.

These problems have a practical effect on farmers. Inaccurate seed disbursement leads to the use of more seeds and a loss of plant population. Damage to seeds also leads to reduced plant population. Complex structures lead to increased maintenance for the farmer and more materials and assembly time for the manufacturer. Either through increased equipment costs or inferior results after planting, the farmer is affected.

Thus, there is a need in the art for a device which improves upon the problems in the art which is accurate, inexpensive to produce, effective, reliable, compact, and does not have a tendency to damage seed during distribution. While metering devices presently exist for traditional planters, deficiencies still exist.

Therefore, a principal objective of the present invention is to provide a seed metering device which improves upon or solves the problems and deficiencies existing in the art.

A further object of this invention is to provide a seed metering device wherein seed is dispersed in a singulated and metered manner at a uniform chosen rate with minimum damage to the seeds.

Another object of this invention is to provide a seed metering device which evenly spaces agricultural seed within a seed trench or furrow.

Another object of the invention is to provide a seed metering device which minimizes carryover or missing seeds in the seed dispersing process.

A still further object of the present invention is to provide a seed metering device which is applicable to a wide variety of seeds.

Another object of the present invention is to provide a seed metering device which is relatively simple in structure while maintaining high accuracy.

A still further object of the present invention is to provide a seed metering device which easily adjusts to different types of seeds and a different speed or rate of planting.

Another object of the present invention is to provide a seed metering device which is economical with respect to the type and cost of materials required by the power source which drives the meter.

Another object of the present invention is to provide a seed metering device which is durable and easy to manufacture and maintain.

Another object of the present invention is to provide a seed metering device of a minimal number of parts.

These and other features, objectives, and advantages of the present invention will become apparent to those skilled in the art with reference to the accompanying specification and claims.

SUMMARY OF INVENTION

The present invention relates to a seed metering device for use with planting implements. The invention allows accurate and reliable placement of agricultural seed with respect to one another, and provides a singulation system which handles seeds gently at several variable speeds. A variety of types of agricultural seed can be used with the seed metering device of the present invention and alternative embodiments exist to allow for different sizes and shapes of seeds.

The invention is a seed metering assembly including sprocket wheels aligned substantially in a vertical plane with a seed conveyor device which interlocks with and surrounds the outer edge of the sprocket wheels. A housing having side and end walls encompass the sprocket wheels and seed conveyor device. The end walls are curved and form a closed area along the ends of the outer edge of the seed conveyor device and the side walls form a closed area with the vertical plane of the sprocket wheels. Above the seed conveyor device in the housing is a seed containment area and below the seed conveyor device in the housing is a seed release area. The sprocket wheels are connected to a rotational power device so that the seed conveyor device similarly rotates around the sprocket wheels between the containment area and release area.

The outer edge of the seed conveyor device includes a plurality of containment pockets. The containment pockets are formed to receive seeds of various sizes, shapes and types.

Attached to one of the end walls of the housing, positioned above the seed conveyor device, is a knock off brush which prevents seeds not placed in the containment pockets from inadvertently being carried from the seed containment area to the seed release area. The knock off brush is made of a firm material which prevents access to the closed area, yet is flexible enough not to damage seeds. The seed conveyor device is made of a material that maintains enough flexibility to rotate about the sprocket wheels while also maintaining enough firmness to interlock with the sprocket wheels and not pinch the seeds contained in the pockets. The interlocking element between the seed conveyor device and the sprocket wheels prevents slippage and results in greater accuracy. The firmness of the seed conveyor device protects seeds and minimizes seed degradation as seeds are not pinched when placed in pockets.

In operation, seeds are placed in the seed containment area and fall by force of gravity into containment pockets on the seed conveyor device. When sprockets are rotated by means of a power source the seed conveyor device, which is interlocked with the sprocket wheels, rotates in the same direction as the sprocket wheels. As the seed conveyor device rotates, the knock off brush prevents seeds not contained in the containment pockets from inadvertently being carried from the containment area to the release area. Seeds that are in the containment pocket travel along the curved side of the housing until they reach the seed release area where by force of gravity the seeds drop into a distribution device for planting. Once the seed is released from the containment pocket the empty pocket rotates to the other side of the housing, around the curved area, returning to the seed containment area where an additional seed drops by force of gravity into the empty containment pocket. For different variations of seed disbursement this process is repeated at different speeds produced by the power source.

BRIEF DESCRIPTION OF THE FIGURES OF THE DRAWINGS

FIG. 1 is an elevational view of a tractor towing an implement containing a plurality of the seed metering devices according to the present invention.

FIG. 2 is an enlarged perspective view of the farm implement of FIG. 1 showing the plurality of seed metering devices.

FIG. 3 is a sectional side view taken along line 3—3 of the seed metering device of FIG. 2.

FIG. 4 is an enlarged sectional view of the seed metering device useable with the present invention.

FIG. 5 is an elevational frontal view taken on line 5—5 of FIG. 4.

FIG. 6 is an enlarged exploded perspective view of an embodiment of the seed metering device.

DETAILED DESCRIPTION OF THE PREFERRED EMBODIMENT

To provide a better understanding of the invention, one preferred embodiment of the invention will now be described in detail. It is to be understood that the preferred embodiment discussed below is but one form the invention can take and is not exclusive.

The description will make frequent references to the accompanying drawings. Reference numerals and/or letters will be utilized to indicate certain parts or locations in the drawings. The same reference numbers and/or letters will be used to indicate the same parts or locations in all of the drawings unless otherwise indicated. FIGS. 1 and 2 depict one environment in which the seed metering device of the present invention can exist. In FIG. 1, tractor 2 is shown connected to a grain drill implement 4, in a typical arrangement for planting row crops in the ground.

In FIG. 2, the rear of implement 4 can be seen. In this embodiment, grain drill 4 includes a plurality of closely spaced row-planting apparatus, in this case each only several inches apart. In particular in FIG. 2, the plurality of seed metering devices 10 according to the preferred embodiment of the invention can be seen distributed basically aligned laterally across implement 4. The size of the devices 10 are relatively compact both in width and height (as well as depth) to allow close spacing in the implement 4. Close meter spacing allows for close row spacing to maximize yield. As will be discussed in more detail later, devices 10 receive seed from a large seed box 6, singulate that seed and through additional components present it in accurately timed succeeding intervals to ground working tools that plant it into the ground.

FIGS. 3–6 show in detail the structure of each seed metering device 10. The seed metering device 10 of FIG. 4 consists of sprocket wheels 12, a belt or seed conveyor 14, and a housing 16. The housing 16 has end walls 18 and side walls 20. The end walls 18 are curved and form a closed area between the end walls 18 and the outer edge of the seed conveyor device 14. The side walls 20 form a closed area along the vertical plane of the sprocket wheels 12. The housing 16 has an open area above the seed conveyor 14 which defines a seed containment area 22. Likewise, the housing 16 has an open area below the seed conveying device 14 which defines a seed release area 24.

The sprocket wheels 12 are connected to a rotational power device (not shown in the drawings) by a shaft engagement means 26 so that the seed conveyor device 14 travels rotatively around the sprocket wheels 12 between the seed containment area 22 and the seed release area 24. A plurality of metering devices 10 may be connected to the rotational power device by a single shaft (not shown in drawings).

The seed conveyor device 14 interlocks and surrounds the outer edge of the sprocket wheels 12. The interlocking means includes nibs 13A on the inner edge of the seed conveyor device 14 which communicate with similar nibs 13B on the sprocket wheels 12. While a traditional belt may be used, the interlocking means reduces slippage between the seed conveyor device 14 and the sprocket wheels 12 which leads to greater accuracy in seed disbursement.

The outer edge of the seed conveyor device 14 includes a plurality of containment pockets 28. The containment pockets have an upper rim 30 near the surface of the seed conveyor device 14 which are substantially spherical in shape and narrow from the upper rim 30. The containment pockets 28 are shaped to receive a number of different types, sizes, and shapes of seeds. The containment pockets 28 are shown in FIG. 6 as being set in a staggered relationship, with the upper rim 30 of one pocket 28 in one row being located between the upper rims 30 of a pocket 28 located in a second row.

The seed conveyor device 14 is shown as being of sufficient width for two pockets 28 separated by divider rim 31 and is made of a material that maintains enough flexibility to rotate about the sprocket wheels 12 while also maintaining enough firmness to interlock with the sprocket wheels 12 and not pinch around seeds in the containment pockets 28 causing seed degradation.

In order to prevent a seed from being inadvertently carried from the seed containment area 22 to the seed release area 24 a knock off brush 32 is positioned above the outer edge of the seed conveyor device 14 and is attached to one of the end walls 18A. The knock off brush is made of a firm material that is durable yet flexible enough so as not to cause seed degradation.

The operation of the seed metering device 10 is best illustrated by referring to FIG. 3. Seed from the seed box 6 falls by gravity into the seed containment area 22 of the meter 10. The seed conveyor device 14 rotates at a predetermined speed which allows the user to set the distance between the singulated seed. Seeds from the seed containment area 22 fill the containment pockets 28 of the seed conveyor device 14. As the seed conveyor device 14 rotates, the knock off brush 32 prevents seeds not placed in the containment pockets 28 from being transmitted to the seed release area 24.

Seeds in the containment pockets 28 travel through the partially closed curved area between the end wall 18A and the outer edge of the seed conveyor device 14. Once the seeds reach the seed release area 24 they fall by force of gravity from the containment pockets 28 to some form of a seed planting device. The force of gravity is assisted by the elasticity of seed conveyor device 14. As each containment pocket reaches the curved area, the distance between rims 30 increases allowing seeds to fall freely when they reach the release area 24. Similarly, a majority of seeds are gathered in the pockets 28 as the seed conveyor device 14 first enters the seed containment area 22. Here, the pockets 28 are wider and close to hold the seeds as they travel through the seed containment area 22.

The empty containment pockets 28 then continue to rotate around the opposite curved portion of the end wall 18B returning to the seed containment area 22 where additional seeds fill the containment pockets 28 by force of gravity. FIG. 3 shows the overall relation of all the parts of the present invention. The sprocket wheels 12 and seed conveyor device 14 are enclosed in a housing 16. Located above the seed conveyor device 14 is the seed containment area 22 and below the seed conveyor device 14 is the seed release area 24. The end walls 18 of the housing 16 form a closed area with the outer edge of the seed conveyor device 14 and FIG. 5 shows the side walls 20 forming a closed area with the vertical plane of the sprocket wheels 12.

As shown in FIG. 2 a plurality of these seed metering devices 10 are positioned in a substantially linear orientation with a grain drill implement 4. This implement 4 is traditionally towed behind a tractor or other propulsion means 2. The preferred embodiment including the sprocket wheels 12 and housing 16 can be made of plastic moldable parts. This greatly enhances the economy of the preferred embodiment. The relatively compact size allows the close spacing of a plurality of devices 10 which in turn allows use of this metering device for closely spaced rows. It is to be appreciated that the included preferred embodiment is given by way of example only. The present invention can take many forms and embodiments. The true essence and spirit of this invention is defined in the appended claim and it is not intended that the embodiment of the invention presented herein limit the scope thereof. It can be seen, however, that the present invention accomplishes at least all of the stated objectives.

For example, the preferred embodiment has been shown used with a grain drill. It can also be used in other types of planting devices including conventional corn planter type units or other more exotic planting devices. This highlights the flexibility of the present invention.

The invention can work with major seed crops such as field corn and soybeans, but also many different types of seeds including but not limited to such seeds as popcorn, pinto beans, etc. Different pocket 28 configurations may be utilized.

It is also to be understood that the configuration of the preferred embodiment allows operation at a wide variety of speeds. That is, a high rate of seeds per second can be metered. For example, device 10 works accurately at 3200 or more seeds per minute. It also would work well for lesser rates.

Various modifications of the above-described preferred embodiment will be apparent to those skilled in the art and may be made without departing from the spirit or scope of the attached claims.

What is claimed is:

1. A belted seed metering device comprising:

at least two sprocket wheels;

a seed conveyor belt driven by one of the sprocket wheels; and a housing having first and second side and end walls, a seed containment area defined between the first and second end walls, a seed release area defined below the seed conveyor belt, and a seed gathering area located adjacent one of the sprocket wheels.

2. The device of claim 1 wherein the seed gathering area is substantially located between the belt and the first side wall.

3. The device of claim 2 wherein said outer edge of said seed conveyor belt includes a plurality of staggered containment pockets.

4. The device of claim 3 wherein said containment pockets have an upper rim near the surface of the seed conveyor device, are substantially hemispherical in shape, and narrow from said upper rim.

5. The device of claim 4 wherein a knock off brush is attached to one of said end walls of said housing, positioned above said outer edge of said seed conveyor device.

6. The device of claim 5 wherein said end wall opposite said knock off brush form a closed area with the outer edge of said seed conveyor device whereby seeds from said containment area are prevented from dropping through to said release area.

7. The device of 6 wherein said seed conveyor device is made of a material that maintains enough flexibility to rotate about said sprocket wheels while also maintaining enough firmness to interlock with said sprocket wheels and not pinch around seeds in said containment pockets.

8. The device of claim 7 wherein said seed conveyor device has nibs on the inner edge which communicate with said sprocket wheels whereby as said sprocket wheels rotate said seed conveyor device similarly rotates.

9. A method for discharging agricultural seeds, said method comprising:

connecting one of a plurality of sprocket wheels to a rotational power source, connecting a seed conveyor belt with the sprocket wheels, providing a housing which encloses the sprocket wheels and the seed conveyor belt, the housing having side and end walls, and a top and bottom, wherein the top of the housing is open and formed to define a seed containment area and the bottom of the housing is open and formed to define a seed release area, and providing seeds to said seed containment area whereby seeds are moved by the seed conveyor belt from a seed gathering area adjacent to one of the sprocket wheels generally between the belt and an end wall, to the seed release area.

* * * * *